(12) United States Patent
Chiang (10) Patent No.: US 12,078,225 B1
(45) Date of Patent: Sep. 3, 2024

(54) ROPE BUCKLE ASSEMBLY

(71) Applicant: NIFCO TAIWAN CORPORATION, Taoyuan (TW)

(72) Inventor: Wen-Ching Chiang, Taoyuan (TW)

(73) Assignee: NIFCO TAIWAN CORPORATION, Taoyuan (TW)

( * ) Notice: Subject to any disclaimer, the term of this patent is extended or adjusted under 35 U.S.C. 154(b) by 0 days.

(21) Appl. No.: 18/331,135

(22) Filed: Jun. 7, 2023

(30) Foreign Application Priority Data

Mar. 15, 2023 (TW) ................................ 112202261

(51) Int. Cl.
*F16G 11/00* (2006.01)
*F16G 11/10* (2006.01)

(52) U.S. Cl.
CPC ......... *F16G 11/103* (2013.01); *Y10T 24/3984* (2015.01)

(58) Field of Classification Search
CPC ...... F16G 11/101; F16G 11/02; F16G 11/103; Y10T 24/3984; Y10T 24/3713; Y10T 24/3718; A43C 7/00
See application file for complete search history.

(56) References Cited

U.S. PATENT DOCUMENTS

| | | | | |
|---|---|---|---|---|
| 4,622,723 A * | 11/1986 | Krauss | ................... | F16G 11/101 24/136 R |
| 4,675,948 A * | 6/1987 | Bengtsson | ............ | F16G 11/101 24/136 R |
| 4,794,673 A * | 1/1989 | Yamaguchi | ........... | F16G 11/101 24/543 |
| 2003/0121126 A1 * | 7/2003 | Buscart | ................. | F16G 11/101 24/115 G |
| 2004/0074055 A1 * | 4/2004 | Watabe | ................. | F16G 11/101 24/115 G |
| 2006/0213037 A1 * | 9/2006 | Yoshiguchi | ........... | F16G 11/101 24/115 G |

* cited by examiner

*Primary Examiner* — Robert Sandy
*Assistant Examiner* — Michael S Lee
(74) *Attorney, Agent, or Firm* — Li & Cai Intellectual Property Office (57) ABSTRACT

A rope buckle assembly includes a female buckle and a male buckle. The female buckle has an accommodating slot and a plurality of openings being in spatial communication with and respectively arranged at two opposite side of the accommodating slot. The accommodating slot has two guiding surfaces protruding from a slot bottom thereof. The male buckle has two through holes in spatial communication with each other and includes two elastic arms spaced apart from each other. When the male buckle and the female buckle jointly receive an external force to move from an initial position to a through position, the two elastic arms are compressed and deformed by respectively abutting against the two guiding surfaces, so that each of the two through holes becomes smaller, and each of the two through holes corresponds in position to two of the openings for jointly defining a rope channel.

10 Claims, 10 Drawing Sheets

ROPE BUCKLE ASSEMBLY

CROSS-REFERENCE TO RELATED PATENT APPLICATION

This application claims the benefit of priority to Taiwan Patent Application No. 112202261, filed on Mar. 15, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a rope buckle, and more particularly to a rope buckle assembly having at least one through hole that is capable of being deformed and becoming smaller.

BACKGROUND OF THE DISCLOSURE

A conventional rope buckle assembly includes a female buckle and a male buckle that is inserted into the female buckle and that has at least one through hole. However, since a shape of the at least one through hole is conventionally fixed and cannot be deformed, a structural development of the male buckle is limited and difficult to be improved.

SUMMARY OF THE DISCLOSURE

In response to the above-referenced technical inadequacies, the present disclosure provides a rope buckle assembly to effectively improve on the issues associated with conventional rope buckle assemblies.

In order to solve the above-mentioned problems, one of the technical aspects adopted by the present disclosure is to provide a rope buckle assembly, which includes a female buckle and a male buckle. The female buckle surroundingly forms an accommodating slot that has two guiding surfaces protruding from a slot bottom of the accommodating slot. The female buckle has two first openings that are arranged on one side thereof and that are in spatial communication with the accommodating slot, and two second openings that are arranged on another side thereof and that are in spatial communication with the accommodating slot. The two first openings respectively face toward the second openings along a through direction. The male buckle is inserted into the accommodating slot along an insertion direction perpendicular to the through direction so as to be arranged at an initial position. The male buckle includes a pressing segment and two elastic arms. The pressing segment has a pressing surface exposed from the accommodating slot. The two elastic arms are connected to the pressing segment and are located in the accommodating slot. The two elastic arms are spaced apart from each other along an arrangement direction perpendicular to the through direction and the insertion direction. Each of the two elastic arms has a touching free end arranged away from the pressing segment. The pressing segment and each of the two elastic arms surroundingly define one of two through holes. The two through holes are in spatial communication with each other along the arrangement direction. When the male buckle and the female buckle jointly receive an external force that causes the male buckle to move relative to the female buckle from the initial position to a through position, the two elastic arms are compressed and deformed by using the touching free ends thereof to respectively abut against the two guiding surfaces, such that each of the two through holes is deformed and becomes smaller, and each of the two through holes corresponds in position to one of the two first openings and the corresponding second opening for jointly defining a rope channel that is configured to allow a rope to pass therethrough.

Therefore, in the rope buckle assembly provided by the present disclosure, the structural design of the male buckle and the cooperation between the male buckle and the female buckle can allow each of the two elastic arms to be compressed for immediately providing the elastic force after the touching free end abuts against the corresponding guiding surface, and the male buckle can further provide an additional elastic force through the deformation of each of the two through holes, thereby providing an architecture that is different from that of the conventional rope buckle assemblies.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 1:
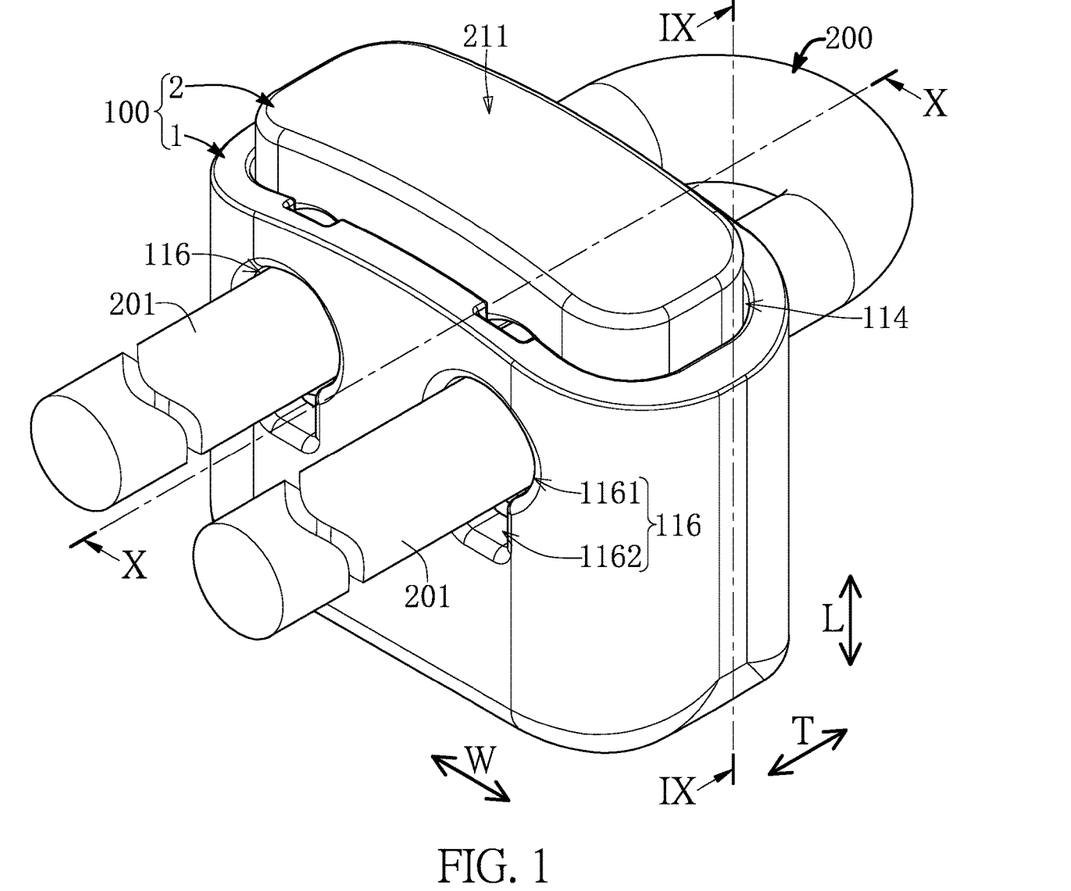
FIG. 1 is a schematic perspective view of a rope buckle assembly in cooperation with a rope according to an embodiment of the present disclosure.
Figure 2:
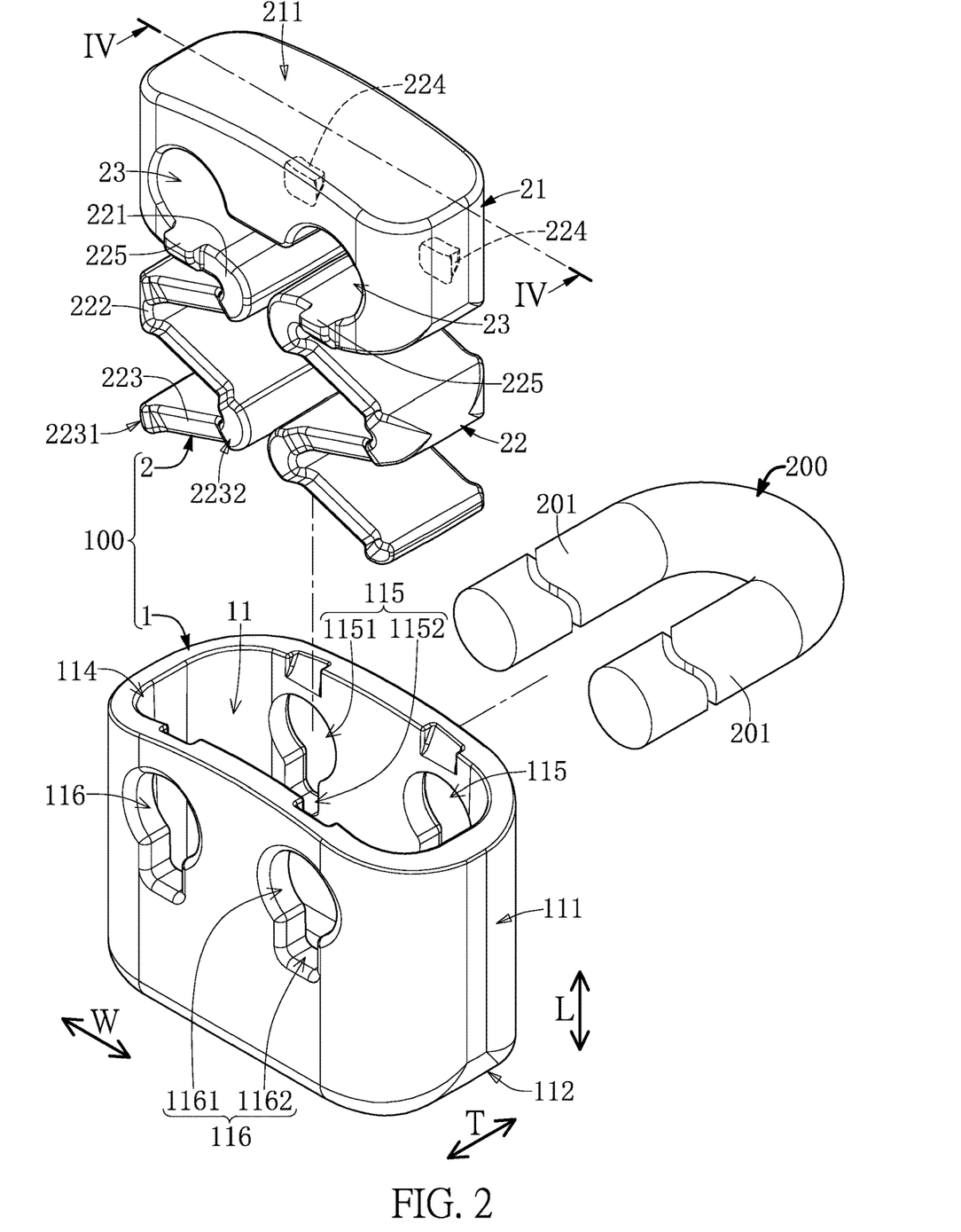
FIG. 2 is a schematic exploded view of FIG. 1.
Figure 3:
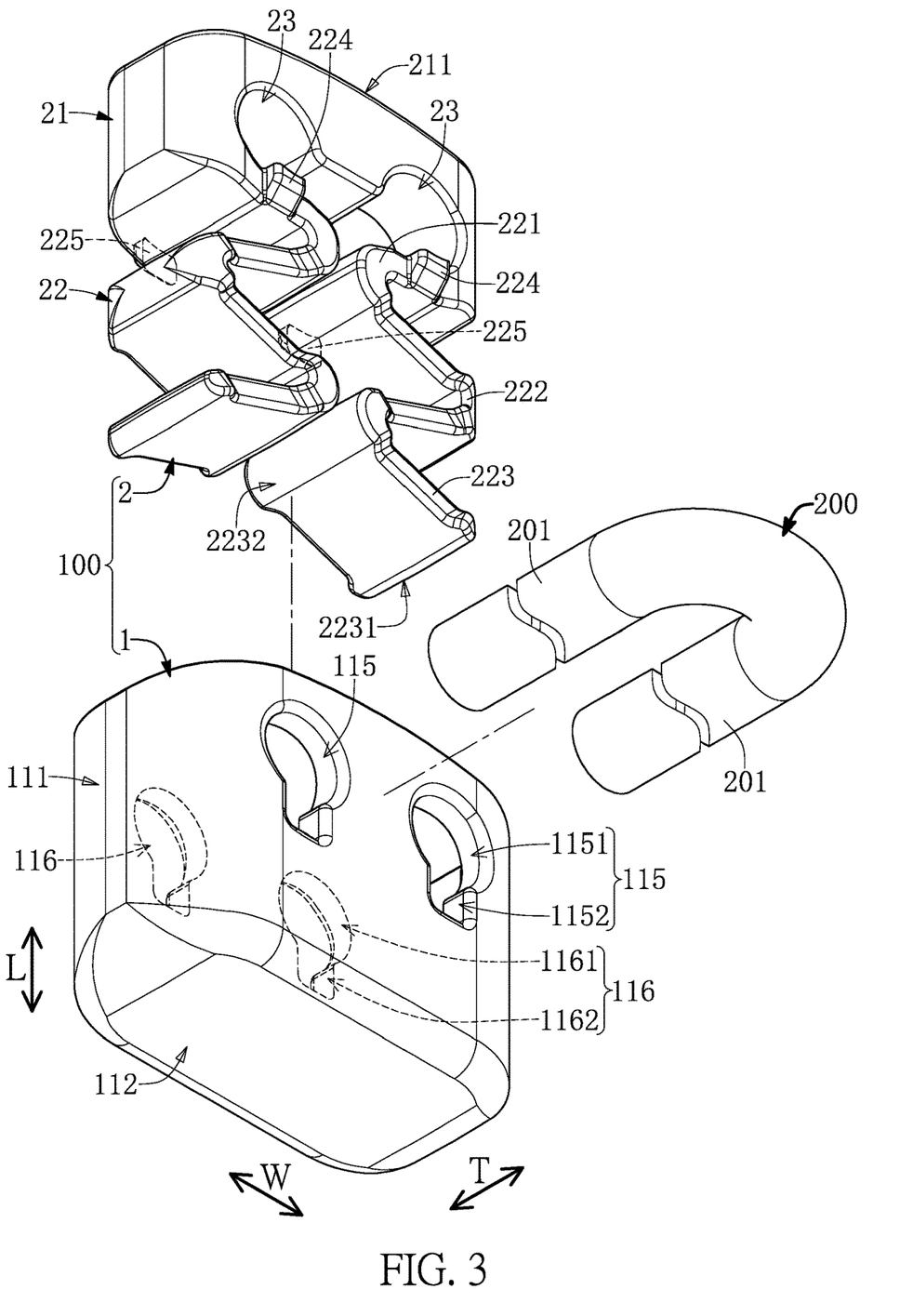
FIG. 3 is a schematic exploded view of FIG. 1 from another angle of view.

Referring to FIG. 1 to FIG. 10, an embodiment of the present disclosure is provided. As shown in FIG. 1 to FIG. 3, the present embodiment provides a rope buckle assembly 100 configured for two segments 201 of a rope 200 to pass therethrough and to be positioned therein. The rope buckle assembly 100 includes a female buckle 1 and a male buckle 2 that is inserted into the female buckle 1 along an insertion direction L. Any one of the female buckle 1 and the male buckle 2 in the present embodiment is integrally formed as a single one-piece structure and can be made of plastic material, but the present disclosure is not limited thereto.

It should be noted that in order to clearly describe connection relationships between the female buckle 1 and the male buckle 2 provided by the present embodiment, the rope buckle assembly 100 further defines a through direction T and an arrangement direction W, where the insertion direction L, the through direction T, and the arrangement direction W are perpendicular to each other.

Figure 4:
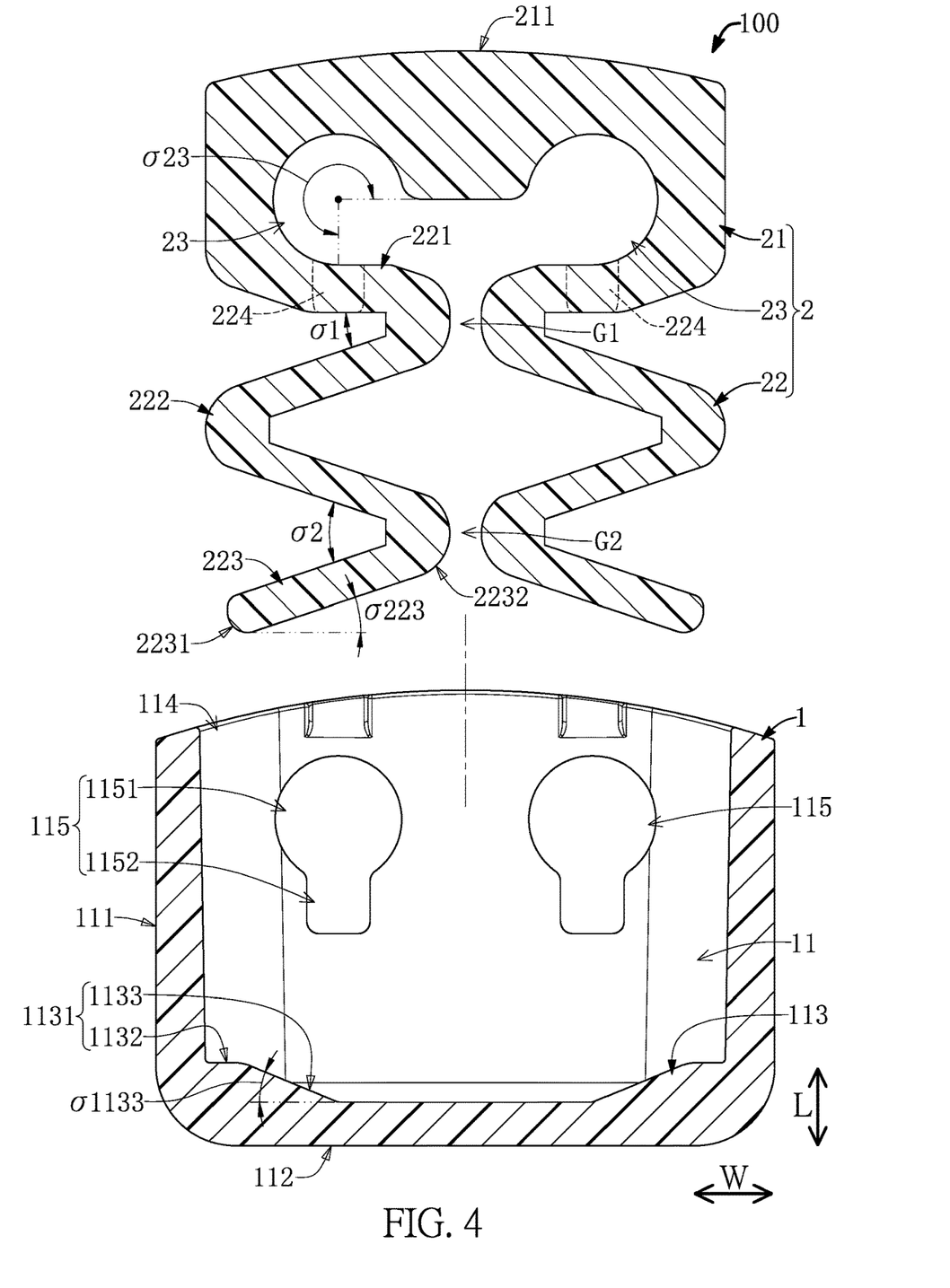
FIG. 4 is a schematic cross-sectional view taken along line IV-IV of FIG. 2.

As shown in FIG. 2 to FIG. 4, the female buckle 1 surroundingly forms (or defines) an accommodating slot 11. The accommodating slot 11 in the present embodiment has a surrounding side wall 111, a slot bottom 112 (perpendicularly) connected to one end of the surrounding side wall 111, and two guiding blocks 113 that are formed on the slot bottom 112. Moreover, a slot opening 114 of the accommodating slot 11 is formed on another end of the surrounding side wall 111.

Furthermore, the female buckle 1 (or the surrounding side wall 111) has two first openings 115 arranged on one lateral side thereof and in spatial communication with the accommodating slot 11 and two second openings 116 that are arranged on another lateral side thereof and that are in spatial communication with the accommodating slot 11. Specifically, the two first openings 115 and the second openings 116 penetrate through the surrounding side wall 111, and the two first openings 115 respectively face toward the second openings 116 along the through direction T.

In the present embodiment, the two first openings 115 are of substantially the same shape and are arranged along the arrangement direction W, and inner walls of the two first openings 115 are respectively flush with inner walls of the two second openings 116 along the through direction T (i.e., the shape of each of the two first openings 115 is identical to the shape of the corresponding second opening 116), but the present disclosure is not limited thereto. For example, in other embodiments of the present disclosure not shown in the drawings, the two first openings 115 can have different shapes; or, each of the two first openings 115 and the corresponding second opening 116 can have different shapes.

Specifically, each of the two first openings 115 in the present embodiment has a first through region 1151 and a first limiting region 1152 that is in spatial communication with the first through region 1151 along the insertion direction L. In each of the two first openings 115, an inner diameter of the first through region 1151 is greater than an inner diameter of the first limiting region 1152, and the first through region 1151 is arranged closer to the slot opening 114 than the first limiting region 1152.

Moreover, each of the two second openings 116 in the present embodiment has a second through region 1161 and a second limiting region 1162 that is in spatial communication with the second through region 1161 along the insertion direction L. In each of the two second openings 116, an inner diameter of the second through region 1161 is greater than an inner diameter of the second limiting region 1162, and the second through region 1161 is arranged closer to the slot opening 114 than the second limiting region 1162.

In addition, each of the two guiding blocks 113 has a guiding surface 1131 protruding from the slot bottom 112. The guiding surfaces 1131 of the two guiding blocks 113 are spaced apart from each other along the arrangement direction W. Furthermore, a distance between the two guiding surfaces 1131 (along the arrangement direction W) gradually increases in a direction away from the slot bottom 112.

In the present embodiment, each of the two guiding surfaces 1131 has a tread surface 1132 (connected to the surrounding side wall 111) and a slanting surface 1133 that is connected to the tread surface 1132 and the slot bottom 112. The tread surface 1132 of each of the two guiding surfaces 1131 is substantially parallel to the slot bottom 112, and the slanting surface 1133 of each of the two guiding surfaces 1131 and the slot bottom 112 have an angle σ1133 therebetween that is less than or equal to 30 degrees, but the present disclosure is not limited thereto. For example, in other embodiments of the present disclosure not shown in the drawings, the tread surface 1132 can be non-parallel to the slot bottom 112 or can be replaced by other structures (e.g., a concave surface).

In the present embodiment, each of the two guiding surfaces 1131 is a curved surface (e.g., a flat surface shown in the drawings), and the two guiding surfaces 1131 are mirror symmetrical to each other, but the two guiding surfaces 1131 can be adjusted or changed according to design requirements and are not limited by the present embodiment. For example, in other embodiments of the present disclosure not shown in the drawings, the two guiding surfaces 1131 can be of different structures, and any one of the two guiding surfaces 1131 can be a convex surface or a concave surface.

Figure 5:
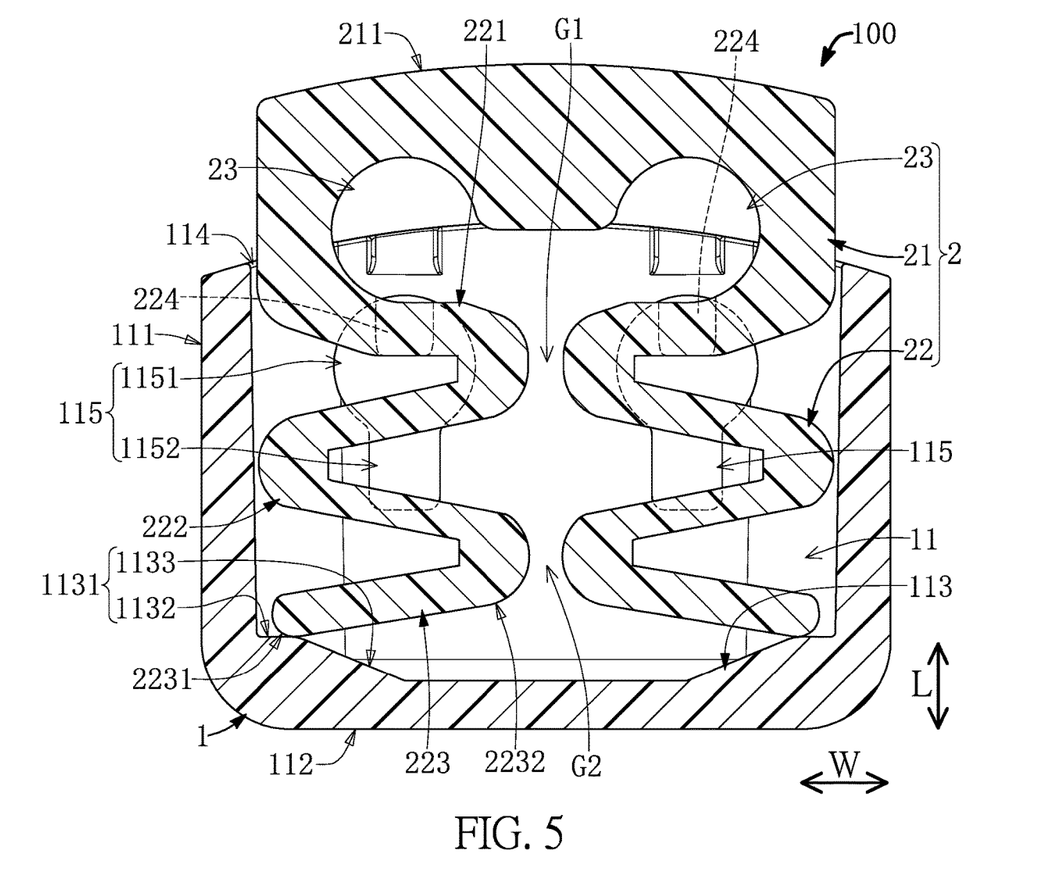
FIG. 5 is a schematic cross-sectional view showing the rope buckle assembly arranged at an initial position.
Figure 6:
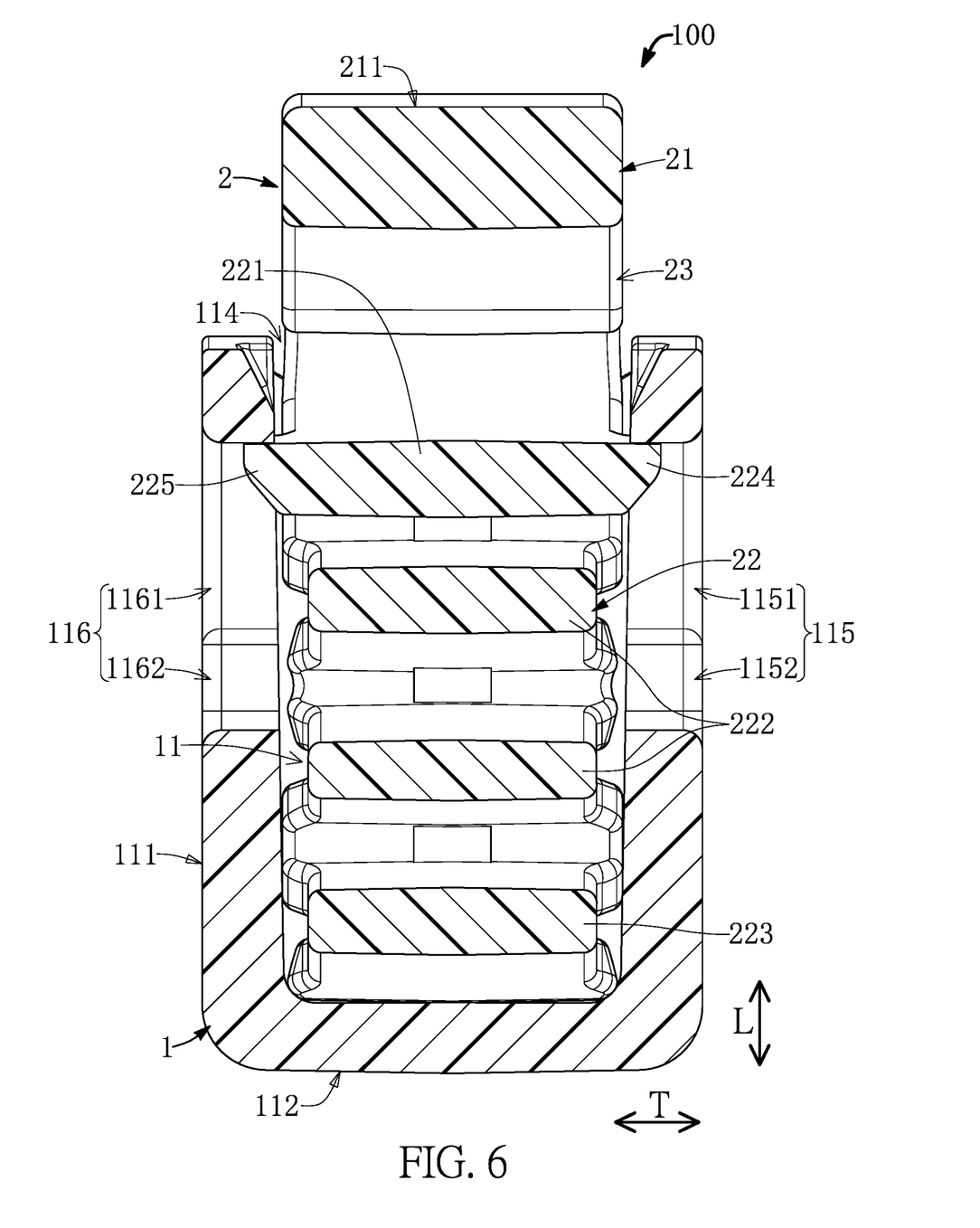
FIG. 6 is a schematic cross-sectional view showing the rope buckle assembly arranged at the initial position from another angle of view.
Figure 7:
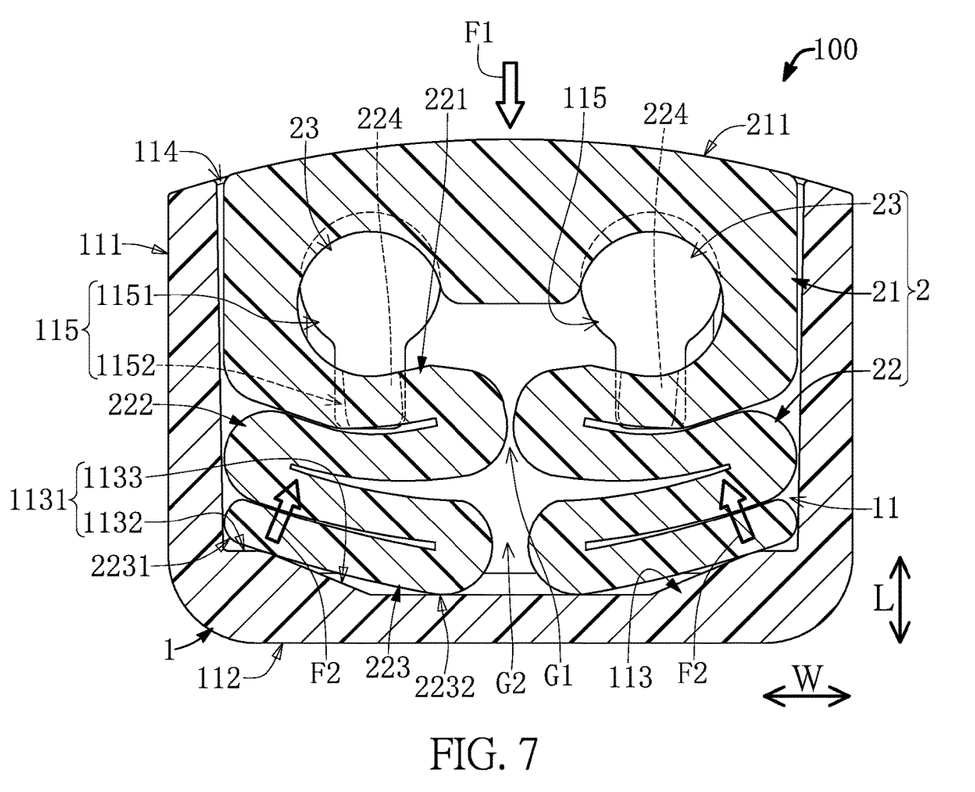
FIG. 7 is a schematic cross-sectional view showing the rope buckle assembly arranged at a through position.
Figure 8:
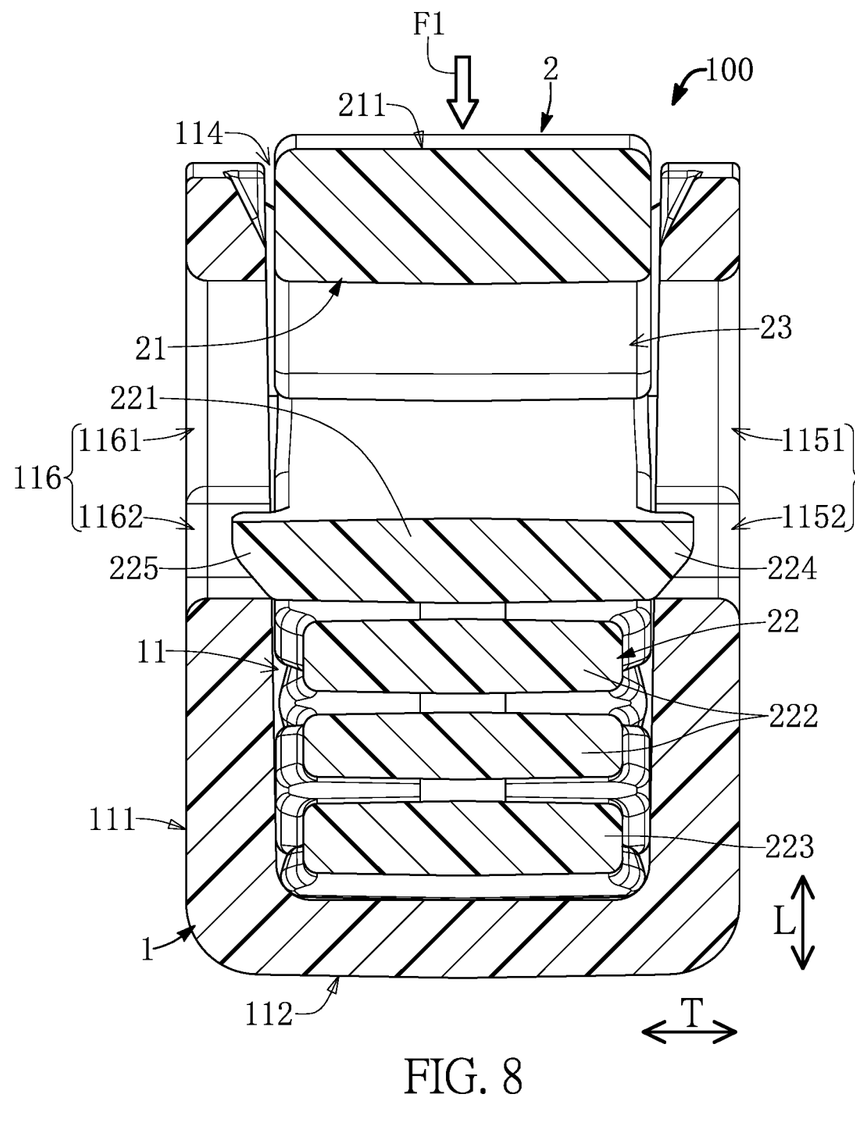
FIG. 8 is a schematic cross-sectional view showing the rope buckle assembly arranged at the through position from another angle of view.
Figure 9:
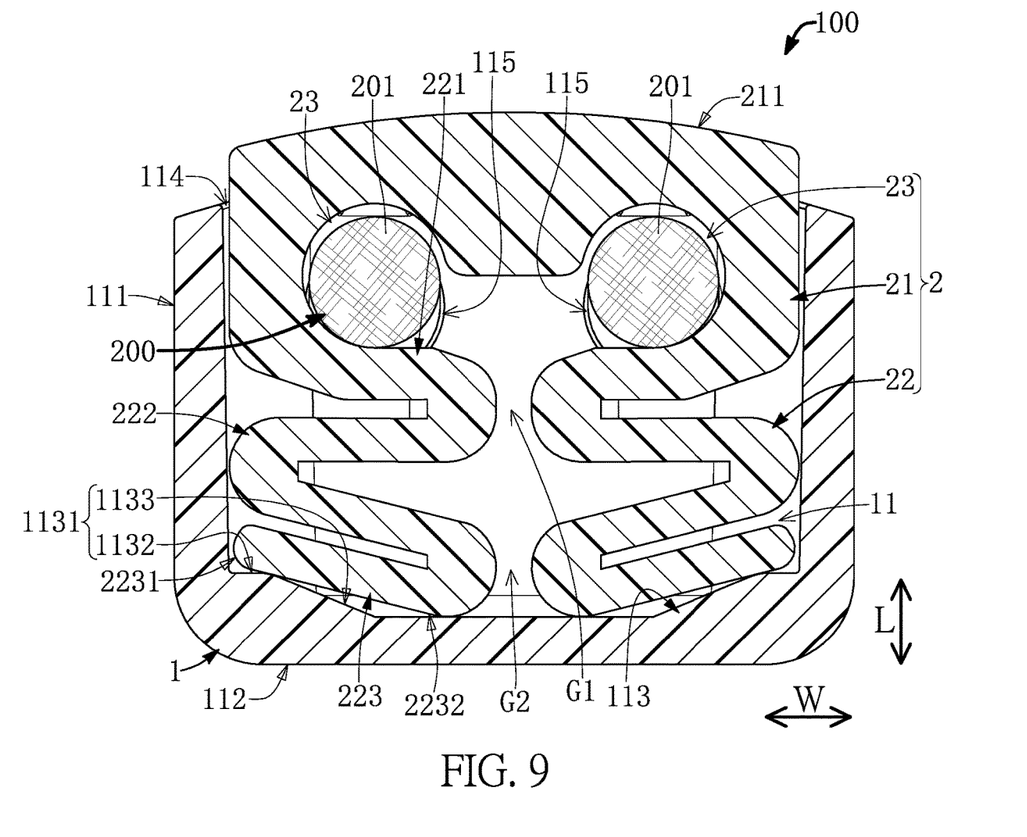
FIG. 9 is a schematic cross-sectional view taken along line IX-IX of FIG. 1.
Figure 10:
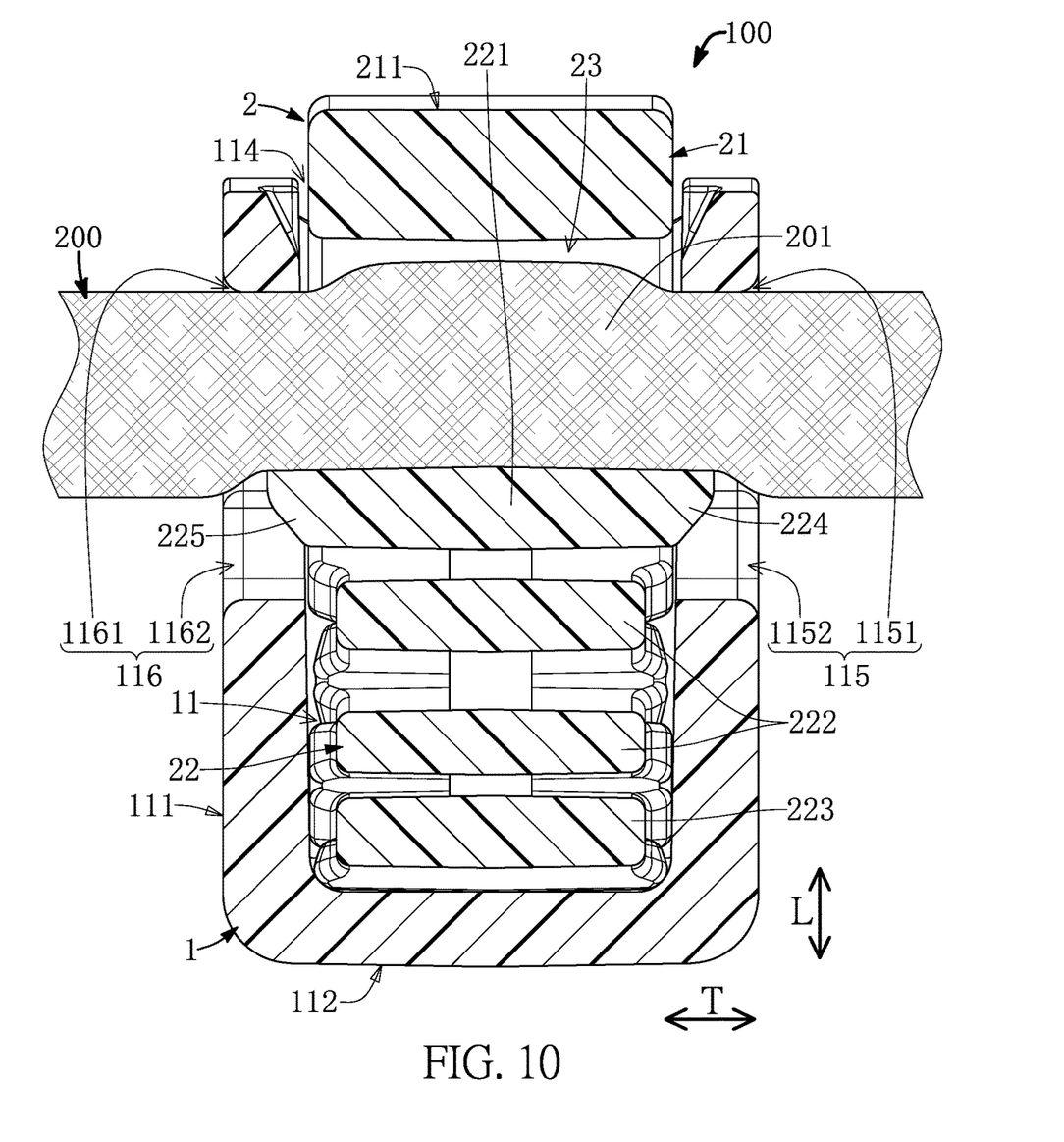
FIG. 10 is a schematic cross-sectional view taken along line X-X of FIG. 1.

The male buckle 2 is assembled to the female buckle 1 by being inserted into the accommodating slot 11 along the insertion direction L, so that the male buckle 2 has a slight deformation relative to an original structure thereof (as shown in FIG. 4) and is arranged at an initial position (as shown in FIG. 5 and FIG. 6). The male buckle 2 and the female buckle 1 can jointly receive an external force F1 to cause the male buckle 2 to move relative to the female buckle 1 from the initial position to a through position (as shown in FIG. 7 and FIG. 8), and the male buckle 2 can be moved from the through position to a clamping position (as shown in FIG. 9 and FIG. 10) after the external force F is removed. It should be noted that in order to clearly describe the male buckle 2 provided by the present embodiment, the following description describes the original structure of the male buckle 2 that is not deformed, and then describes changes to the male buckle 2 that is deformed.

As shown in FIG. 2 to FIG. 4, the male buckle 2 includes a pressing segment 21 and two elastic arms 22 that are connected to the pressing segment 21. The pressing segment 21 and each of the two elastic arms 22 surroundingly define one of two through holes 23, where the two through holes 23 are in spatial communication with each other along the arrangement direction W. For example, each of the two through holes 23 has an arced edge having a central angle σ23 that is preferably within a range from 240 degrees to 300 degrees, but the present disclosure is not limited thereto.

Specifically, the pressing segment 21 and a part of each of the two through holes 23 are exposed from (or arranged outside of) the accommodating slot 11, and the two elastic arms 22 are preferably mirror symmetrical to each other and are located in the accommodating slot 11. The pressing segment 21 has a pressing surface 211 exposed from the accommodating slot 11 and arranged away from the slot bottom 112. The pressing surface 211 is a curved surface having a curvature corresponding to that of the slot opening 114, and the male buckle 2 can be pressed by a user along the insertion direction L toward the slot bottom 112 (e.g., the male buckle 2 and the female buckle 1 can jointly receive the external force F1 as shown in FIG. 7 and FIG. 8).

Specifically, the two elastic arms 22 are spaced apart from each other along the arrangement direction W and are respectively connected to two ends of a bottom side of the pressing segment 21. The two elastic arms 22 are substantially located in a space defined by orthogonally projecting the pressing segment 21 toward the slot bottom 112, but the present disclosure is not limited thereto.

In the present embodiment, each of the two elastic arms 22 is substantially a W-shaped structure sequentially including a boundary segment 221 connected to the pressing segment 21, an elastic segment 222, and a tail segment 223, but the present disclosure is not limited thereto. For example, in other embodiments of the present disclosure not shown in the drawings, each of the two elastic arms 22 can be a structure other than the W-shaped structure.

In each of the two elastic arms 22, one end of the boundary segment 221 is connected to the pressing segment 21, and the elastic segment 222 is connected to the tail segment 223 and another end of the boundary segment 221. Moreover, in each of the two elastic arms 22, the elastic segment 222 is preferably V-shaped, the elastic segment 222 is connected to the boundary segment 221 to jointly have a first angle σ1, and the elastic segment 222 is connected to the tail segment 223 to jointly have a second angle σ2 that is greater than the first angle σ1, thereby allowing any one of the two elastic arms 22 to be shaped for providing sufficient elastic force through being elastically deformed, but the present disclosure is not limited thereto.

In other words, the boundary segments 221 of the two elastic arms 22 are arranged in a straight line along the arrangement direction W, and each of the boundary segments 221 is a partial boundary of the corresponding through hole 23. The boundary segments 221 of the two elastic arms 22 have a first gap G1 along the arrangement direction W, where the first gap G1 is in spatial communication with the two through holes 23. As shown in FIG. 4, in a section of the male buckle 2 perpendicular to the through direction T, each of the two through holes 23 is in spatial communication with an external environment along the insertion direction L through the first gap G1.

As shown in FIG. 2 to FIG. 4, in a direction away from the pressing segment 21, a distance between the two elastic segments 222 of the two elastic arms 22 (along the arrangement direction W) gradually increases, and then gradually decreases. In the present embodiment, top ends of the two elastic segments 222 have the first gap G1 therebetween along the arrangement direction W, and bottom ends of the two elastic segments 222 have a second gap G2 therebetween along the arrangement direction W. The first gap G1 and the second gap G2 preferably have a same width.

The tail segment 223 of each of the two elastic arms 22 includes a touching free end 2231 and a connection end 2232 that is arranged away from the touching free end 2231, and is connected to the elastic segment 222 through the connection end 2232. In other words, the second gap G2 is located between the connection ends 2232 of the tail segments 223 of the two elastic arms 22.

Specifically, a distance between the tail segments 223 of the two elastic arms 22 (along the arrangement direction W) gradually decreases in a direction away from the touching free ends 2231 of the two elastic arms 22. The tail segment 223 of each of the two elastic arms 22 and the arrangement direction W preferably have an angle σ223 therebetween being less than 40 degrees.

In summary, when the male buckle 2 and the female buckle 1 jointly receive the external force F1 (e.g., the pressing surface 211 is pressed by a user) to cause the male buckle 2 to move relative to the female buckle 1 from the initial position (as shown in FIG. 5 and FIG. 6) to the through position (as shown in FIG. 7 and FIG. 8), the two elastic arms 22 are compressed and deformed by using the touching free ends 2231 thereof to respectively abut against the two guiding surfaces 1131, so that each of the two through holes 23 is deformed and becomes smaller, and each of the two through holes 23 corresponds in position to one of the two first openings 115 and the corresponding second opening 116 for jointly defining a rope channel that is configured to allow the rope 200 (e.g., one of the two segments 201) to pass therethrough.

Specifically, when the male buckle 2 is moved from the initial position (as shown in FIG. 5 and FIG. 6) to the through position (as shown in FIG. 7 and FIG. 8), the touching free end 2231 of each of the two elastic arms 22 first touches a connection part of the tread surface 1132 and the slanting surface 1133 of the corresponding guiding surface 1131, thereby receiving a reaction force F2 in a direction toward the corresponding through hole 23. Moreover, when the male buckle 2 is arranged at the through position (as shown in FIG. 7 and FIG. 8), the connection end 2232 of the tail segment 223 of each of the two elastic arms 22 abuts against the slot bottom 112, but is not in (direct) contact with any one of the two guiding surfaces 1131.

Accordingly, in the rope buckle assembly 100 provided by the present embodiment, the structural design of the male buckle 2 and the cooperation between the male buckle 2 and the female buckle 1 can allow each of the two elastic arms 22 to be compressed for immediately providing the elastic force after the touching free end 2231 abuts against the corresponding guiding surface 1131, and the male buckle 2 can further provide an additional elastic force through the deformation of each of the two through holes 23, thereby providing an architecture that is different from that of the conventional rope buckle assemblies.

Specifically, in each of the two elastic arms 22 as shown in FIG. 2 to FIG. 4, the elastic force can be provided by the deformation of the elastic segment 222, and the tail segment 223 can swing toward the elastic segment 222 to further provide an elastic force by being slantingly arranged relative to the arrangement direction W after the touching free end 2231 abuts against the corresponding guiding surface 1131. In addition, the deformation of each of the two through holes 23 is based on the deformation of the corresponding boundary segment 221, and the boundary segment 221 can provide an elastic force through the deformation thereof.

In addition, when the male buckle 2 is arranged at the through position (as shown in FIG. 7 and FIG. 8), each of the two elastic arms 22 is compressed and deformed along the insertion direction L so as to have an elastic recovery force. When the external force F1 is removed to cause the male buckle 2 to move from the through position (as shown in FIG. 7 and FIG. 8) to the clamping position (as shown in FIG. 9 and FIG. 10), each of the two elastic arms 22 releases the elastic recovery force to enable a portion of the rope 200 (e.g., the corresponding segment 201) in the rope channel to be clamped and positioned between the female buckle 1 and the male buckle 2.

It should be noted that each of the two elastic arms 22 includes a first protrusion 224 and a second protrusion 225 that is opposite to the first protrusion 224. The first protrusion 224 and the second protrusion 225 of each of the two elastic arms 22 are formed on two opposite sides of the boundary segment 221 and are respectively arranged in the corresponding first opening 115 and the corresponding second opening 116.

Moreover, when the male buckle 2 is moved from the initial position (as shown in FIG. 5 and FIG. 6) to the through position (as shown in FIG. 7 and FIG. 8), the first protrusion 224 of each of the two elastic arms 22 is moved along the insertion direction L from the first through region 1151 to the first limiting region 1152 of the corresponding first opening 115, and the second protrusion 225 of each of the two elastic arms 22 is moved along the insertion direction L from the second through region 1161 to the second limiting region 1162 of the corresponding second opening 116, so that the male buckle 2 can be stably moved in the accommodating slot 11 of the female buckle 1.

Beneficial Effects of the Embodiment

In conclusion, in the rope buckle assembly provided by the present disclosure, the structural design of the male buckle and the cooperation between the male buckle and the female buckle can allow each of the two elastic arms to be compressed for immediately providing the elastic force after the touching free end abuts against the corresponding guiding surface, and the male buckle can further provide an additional elastic force through the deformation of each of the two through holes, thereby providing an architecture that is different from that of the conventional rope buckle assemblies.

Specifically, in each of the two elastic arms, the elastic force can be provided by the deformation of the elastic segment, and the tail segment can swing toward the elastic segment to further provide an elastic force by being slantingly arranged relative to the arrangement direction after the touching free end abuts against the corresponding guiding surface. In addition, the deformation of each of the two through holes is based on the deformation of the corresponding boundary segment, and the boundary segment can provide an elastic force through the deformation thereof.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A rope buckle assembly, comprising:
   a female buckle surroundingly forming an accommodating slot that has two guiding surfaces protruding from a slot bottom of the accommodating slot, wherein the female buckle has two first openings arranged on one side thereof and in spatial communication with the accommodating slot and two second openings that are arranged on another side thereof and that are in spatial communication with the accommodating slot, and wherein the two first openings respectively face toward the second openings along a through direction; and
   a male buckle that is inserted into the accommodating slot along an insertion direction perpendicular to the through direction so as to be arranged at an initial position, wherein the male buckle includes:
      a pressing segment having a pressing surface exposed from the accommodating slot; and
      two elastic arms connected to the pressing segment and located in the accommodating slot, wherein the two elastic arms are spaced apart from each other along an arrangement direction perpendicular to the through direction and the insertion direction, and each of the two elastic arms has a touching free end arranged away from the pressing segment;
      wherein the pressing segment and each of the two elastic arms surroundingly define one of two through holes, and wherein the two through holes are in spatial communication with each other along the arrangement direction;
   wherein, when the male buckle and the female buckle jointly receive an external force to cause the male buckle to move relative to the female buckle from the initial position to a through position, the two elastic arms are compressed and deformed by using the touching free ends thereof to respectively abut against the two guiding surfaces, such that each of the two through holes is deformed and becomes smaller, and each of the two through holes corresponds in position to one of the two first openings and a corresponding one of the second openings for jointly defining a rope channel that is configured to allow a rope to pass therethrough.

2. The rope buckle assembly according to claim 1, wherein each of the two elastic arms has a tail segment having the touching free end thereof, and a distance between the tail segments of the two elastic arms gradually decreases in a direction away from the touching free ends of the two elastic arms.

3. The rope buckle assembly according to claim 2, wherein each of the two guiding surfaces has a tread surface and a slanting surface that is connected to the tread surface and the slot bottom, and the tail segment of each of the two elastic arms has a connection end arranged away from the touching free end; wherein, when the male buckle is moved from the initial position to the through position, the touching free end of each of the two elastic arms first touches a connection part of the tread surface and the slanting surface of the corresponding guiding surface, thereby receiving a reaction force in a direction toward the corresponding through hole; and wherein, when the male buckle is arranged at the through position, the connection end of the tail segment of each of the two elastic arms abuts against the slot bottom, but is not in contact with any one of the two guiding surfaces.

4. The rope buckle assembly according to claim 2, wherein the tail segment of each of the two elastic arms and the arrangement direction have an angle therebetween being less than 40 degrees.

5. The rope buckle assembly according to claim 2, wherein the two guiding surfaces are spaced apart from each other along the arrangement direction, and a distance between the two guiding surfaces gradually increases in a direction away from the slot bottom.

6. The rope buckle assembly according to claim 1, wherein each of the two elastic arms includes:
- a boundary segment having one end connected to the pressing segment, wherein the boundary segment is a partial boundary of the corresponding through hole; and
- an elastic segment connected to the tail segment and another end of the boundary segment;

wherein the boundary segments of the two elastic arms have a first gap along the arrangement direction, and the first gap is in spatial communication with the two through holes.

7. The rope buckle assembly according to claim 6, wherein each of the two first openings has a first through region and a first limiting region that is in spatial communication with the first through region, and each of the two elastic arms includes a first protrusion that is formed on the boundary segment thereof and that is arranged in the corresponding first opening; wherein, when the male buckle is moved from the initial position to the through position, the first protrusion of each of the two elastic arms is moved along the insertion direction from the first through region to the first limiting region of the corresponding first opening.

8. The rope buckle assembly according to claim 6, wherein the two elastic arms are mirror symmetrical to each other, and wherein, in each of the two elastic arms, the elastic segment is V-shaped, the elastic segment is connected to the boundary segment to jointly define a first angle, and the elastic segment is connected to the tail segment to jointly define a second angle that is greater than the first angle.

9. The rope buckle assembly according to claim 6, wherein the boundary segments of the two elastic arms are arranged in a straight line along the arrangement direction, and each of the two through holes has an arced edge having a central angle within a range from 240 degrees to 300 degrees.

10. The rope buckle assembly according to claim 1, wherein, when the male buckle is arranged at the through position, each of the two elastic arms is compressed and deformed along the insertion direction so as to have an elastic recovery force, and wherein, when the external force is removed to cause the male buckle to move from the through position to a clamping position, each of the two elastic arms releases the elastic recovery force to enable a portion of the rope in the rope channel to be clamped and positioned between the female buckle and the male buckle.

* * * * *